No. 801,943. PATENTED OCT. 17, 1905.
R. T. WEAVER.
APPARATUS FOR PURIFYING WATER.
APPLICATION FILED JAN. 10, 1905.
3 SHEETS—SHEET 3.
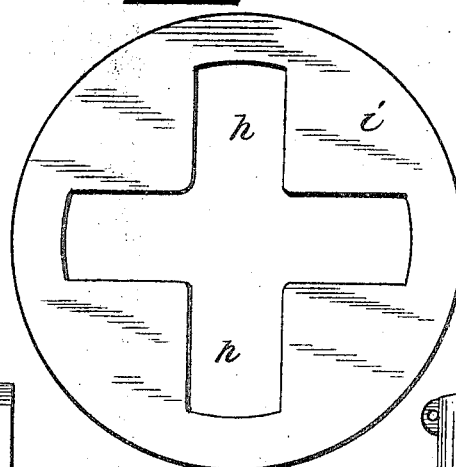
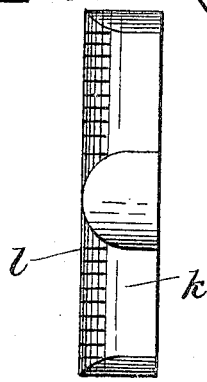
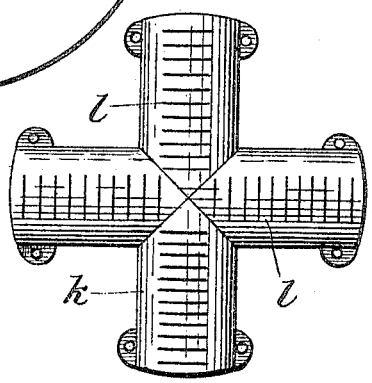
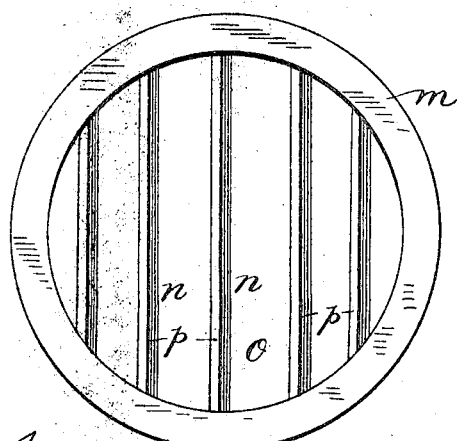
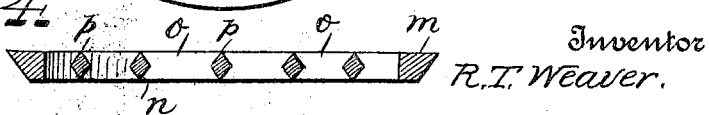
Witnesses
Franck L. Ousand
Albert Popkins
Inventor
R. T. Weaver.
by Sturtevant & Greeley
Attorneys

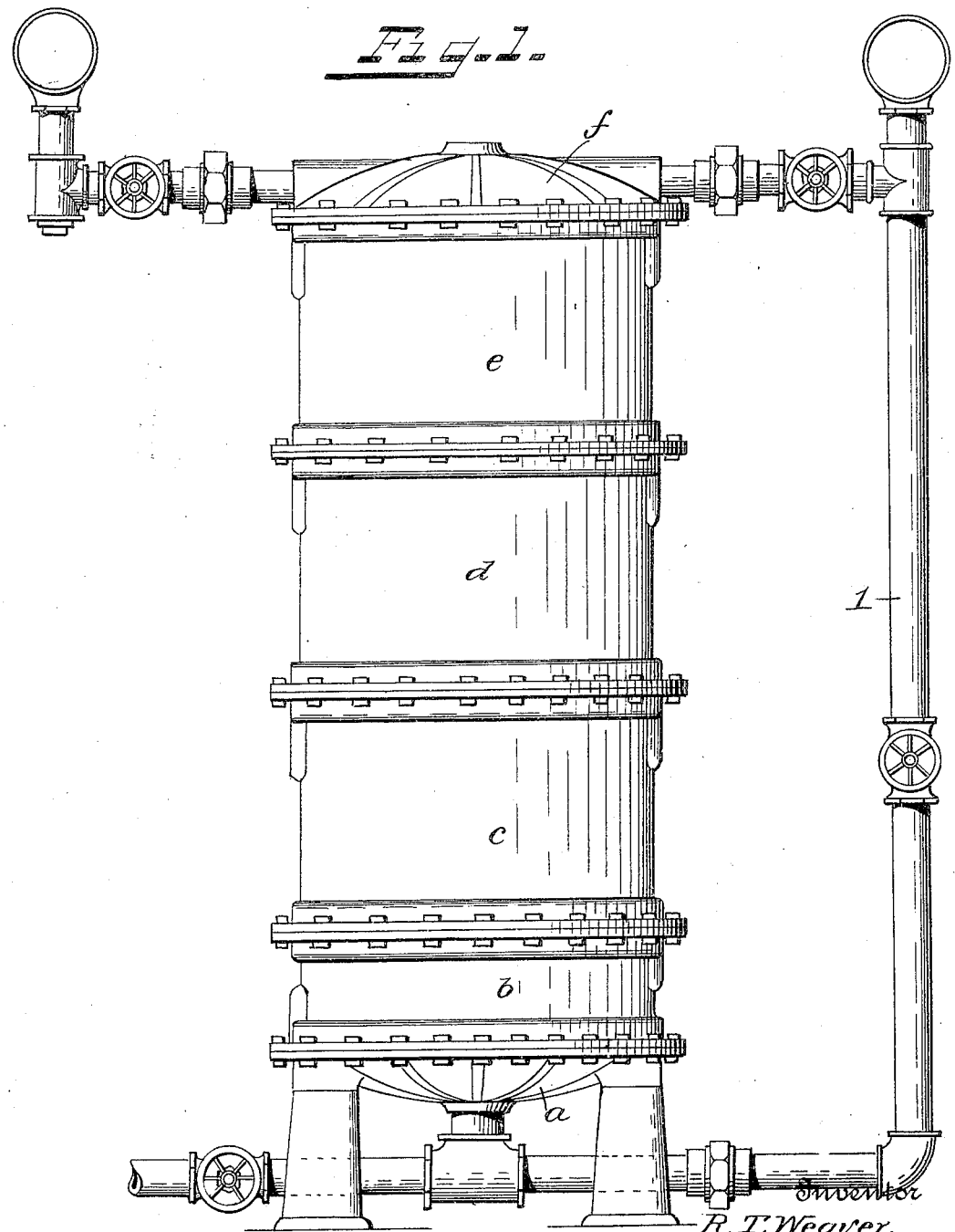

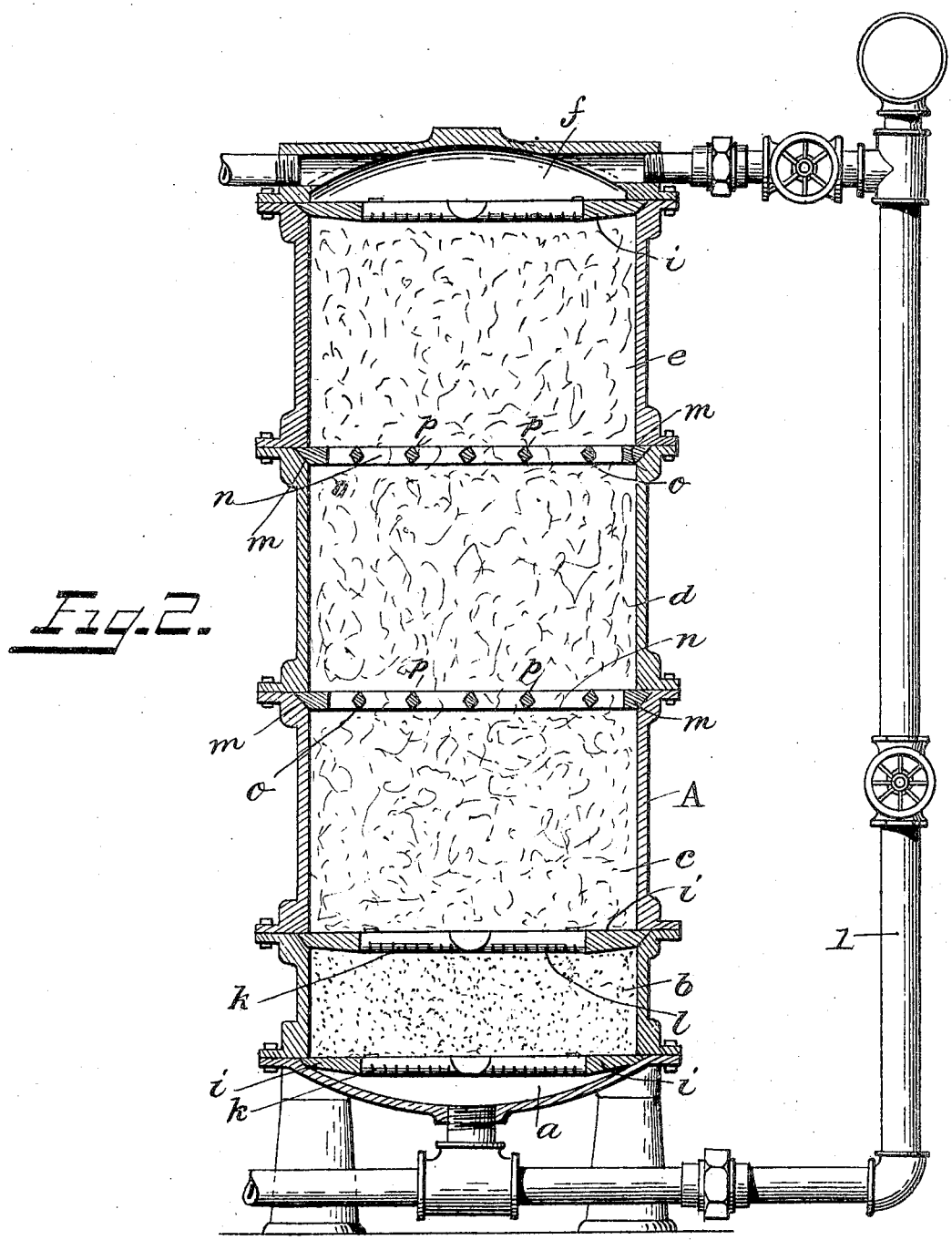

UNITED STATES PATENT OFFICE.

ROBERT T. WEAVER, OF CLEVELAND, OHIO, ASSIGNOR TO JOSEPH SCHNEIBLE, OF WEEHAWKEN, NEW JERSEY.

APPARATUS FOR PURIFYING WATER.

No. 801,943.                    Specification of Letters Patent.                    Patented Oct. 17, 1905.

Application filed January 10, 1905. Serial No. 240,398.

*To all whom it may concern:*

Be it known that I, ROBERT T. WEAVER, a citizen of the United States, residing at Cleveland, in the county of Cuyahoga, State of Ohio, have invented certain new and useful Improvements in Processes of and Apparatus for Purifying Water and Preventing the Formation of Scale in Boilers, of which the following is a description, reference being had to the accompanying drawings, and to the letters and figures of reference marked thereon.

My invention relates to an improvement in process and apparatus for purifying water and preventing the formation of scale in boilers.

So far as the process broadly is concerned the invention consists in passing the water on its way from the feed-water heater to the boiler through a mass of material of a strongly silicious nature, such as a mixture of talc and granite, the water taking up particles of the material and carrying them over into the boiler, said particles forming a silicious nuclei which adhere to the inner surface of the water-tubes of the boiler, thus forming an infinitesimal thin coating protecting the metal and acting as an effective agent to prevent the adhesion of sulfates and carbonates or other scale-producing constituents, besides protecting the metal from corrosion. In practice it has been found that this silicious coating does not increase, but remains substantially of constant thickness, and also in the case of old boilers, in which scale has already formed, acts to remove the old scale.

So far as the apparatus is concerned, it consists, primarily, in a receptacle located between the feed-water heater and the boiler and embodying a chamber or chambers containing a mixture of talc and granite or like material through which the feed-water passes on its way to the boiler. Secondly, it consists in a receptacle located between the feed-water heater and the boiler and embodying a chamber or chambers containing a mixture of talc and granite or like material and having cutting-plates against which the material is forced by the action of the water and disintegrated. Thirdly, it includes a receptacle located between the feed-water heater and the boiler and embodying a filtering-chamber, a chamber or chambers containing a mixture of talc and granite or like material, and cutting-plates for disintegrating the material.

Finally, the invention consists in the construction and arrangement of parts of the apparatus, all substantially as referred to in the appended claims.

The invention is illustrated in the accompanying drawings, in which—

Figure 1 is an elevation of the apparatus embodying my invention and adapted to carry out my improved process. Fig. 2 is a vertical section through the apparatus. Fig. 3 is a top plan view of one of the castings supporting the cutting-plates. Fig. 4 is an edge view of one of the cutting-plates. Fig. 5 is a top plan view of one of the castings for supporting the screen-plates. Figs. 6 and 7 are respectively top and side views of the screen-plate.

In the drawings, A represents the apparatus, which is herein shown as composed of sections $a$, $b$, $c$, $d$, $e$, and $f$, secured together by bolts through the flanges on such sections. The lower section $a$ is supported on standards $g$, and the water from the heater entering the vertical pipe 1 passes through the same and into the chamber or reverse dome of the section $a$ through the inlet 2. It passes into the section $b$, which is filled with filtering material, through the openings $h$ in the casting $i$. Upon this casting is placed a screen-cross $k$, of brass or iron, which is provided with narrow slits $l$ of size to prevent foreign particles from passing into the filtering-chamber. Between the filtering-chamber and the chamber in the section $c$ above it is arranged a similar casting $i$ and screen-plate $k$. The sections $c$, $d$, and $e$ contain a mixture of talc and granite or like silicious material, and between the two sections $c$ and $d$ and $d$ and $e$ are arranged castings $m$, having openings $n$, upon which castings are supported plates $o$, having cutting-surfaces $p$, which rest in said openings. The force of water serves to agitate the mass of talc and granite and causes small particles thereof to be chipped off by the contact under pressure with the cutting-plates and mixing with the water are carried off with it through the pipe 3 into the boiler, large particles being prevented from passing off by the upper screen-plates $i$ and $k$, the pipe 3 leading from the dome into section $f$.

So far as the process of purifying water is concerned any apparatus adapted for carrying out the same may be used; but the apparatus herein shown represents a convenient and novel one for carrying out said process, and I therefore wish to claim the same, it being understood, however, that various minor modifications and changes may be made without departing from the spirit of my invention.

Having thus described my invention, what I claim, and desire to secure by Letters Patent, is—

1. The herein-described process of purifying water and preventing the formation of scale in boilers, which consists in passing the water in its passage between the feed-water heater and the boiler through a mass of talc or granite or other silicious material, substantially as set forth.

2. The herein-described process of purifying water and preventing the formation of scale in boilers, which consists in first passing the feed-water through filtering material and then through a mass of talc and granite or other silicious material, substantially as set forth.

3. The herein-described process of purifying water and preventing the formation of scale in boilers, which consists in first passing the feed-water through filtering material and then through a mass of talc and granite or other silicious material and agitating and causing partial disintegration of the mass, substantially as set forth.

4. The herein-described apparatus comprising a receptacle between the feed-water heater and the boiler and having a chamber adapted to receive and hold material, through which the water passes on its way to the boiler, substantially as described.

5. The herein-described apparatus, comprising a receptacle between the feed-water heater and the boiler and having a chamber or chambers adapted to receive a scale-preventing compound, with cutting-plates against which the compound is forced by the pressure of the water and partially disintegrated, substantially as described.

6. The herein-described apparatus, comprising a receptacle located between the feed-water heater and the boiler, said receptacle including a filtering-chamber and a chamber or chambers to receive a mixture of talc and granite or like silicious material, cutting-plates arranged above, each chamber containing the talc and granite, whereby under the force of the water, the mass may be partially disintegrated, substantially as described.

7. The herein-described apparatus, comprising a receptacle formed in sections secured together and embodying a filtering-chamber, a series of talc and granite or other silicious-material-holding chambers, a screen between the filtering-chamber and the first talc and granite holding chamber, and cutting-plates arranged above each talc and granite holding chamber, substantially as described.

8. In the herein-described apparatus, a sectional receptacle, castings between the sections of the receptacle, certain of said castings supporting screen-plates, while the others support cutting-plates, all substantially as described.

In testimony whereof I affix my signature in presence of two witnesses.

ROBERT T. WEAVER.

Witnesses:
 WALTER G. DEEMER,
 CHARLES G. ROSE.